No. 889,407. PATENTED JUNE 2, 1908.
H. C. SHAW.
DEVICE FOR CHANGING ROLLS.
APPLICATION FILED OCT. 21, 1907.
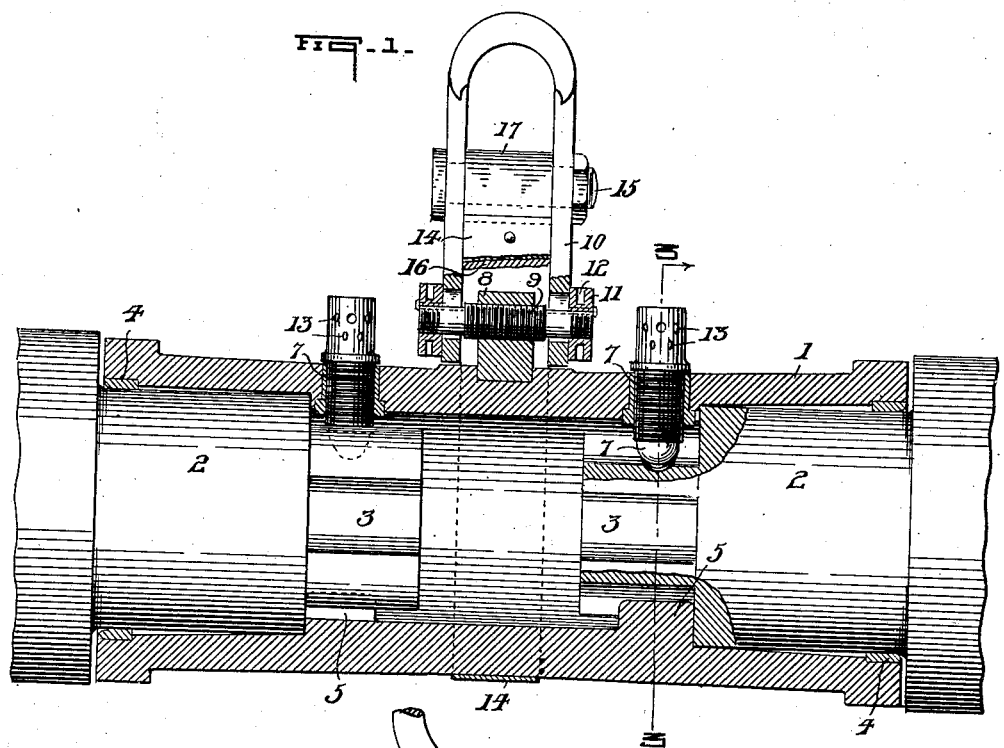
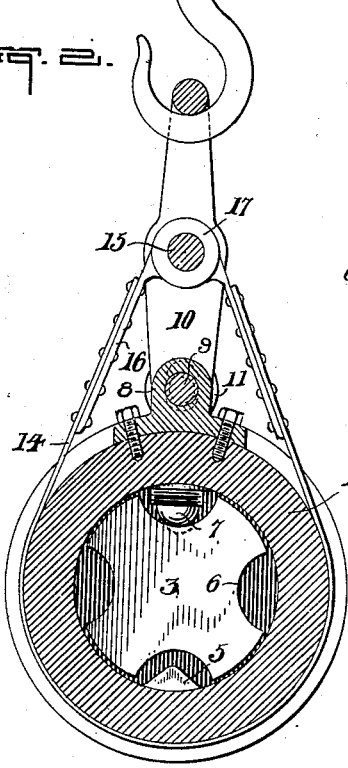
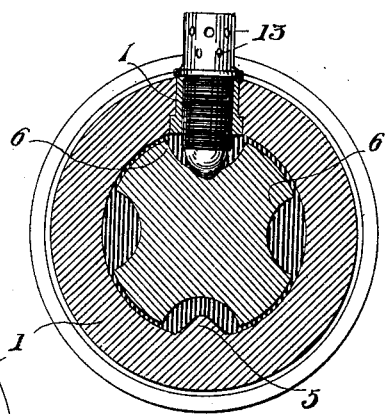
WITNESSES:
INVENTOR
H. C. Shaw,
by F. N. Barber,
his ATTORNEY

UNITED STATES PATENT OFFICE.

HENRY C. SHAW, OF GLENSHAW, PENNSYLVANIA.

DEVICE FOR CHANGING ROLLS.

No. 889,407.　　　　Specification of Letters Patent.　　　　Patented June 2, 1908.

Application filed October 21, 1907. Serial No. 398,317.

*To all whom it may concern:*

Be it known that I, HENRY C. SHAW, a citizen of the United States, residing at Glenshaw, in the county of Allegheny and State of Pennsylvania, have invented or discovered new and useful Improvements in Devices for Changing Rolls, of which the following is a specification.

My invention relates to devices for removing rolls from the housings of rolling mills and inserting other rolls in their stead.

The object of my invention is to provide a simple device of this character which will carry at one time both the roll to be removed and the roll to be substituted and maintain them in a horizontal position even though one roll be heavier than the other.

Referring to the drawings, Figure 1 is a longitudinal section of an apparatus embodying my invention, a portion being shown in elevation; Fig. 2, a central transverse section of Fig. 1; and Fig. 3, a section on the line 3—3 on Fig. 1.

On the drawings, 1 is a hollow cylinder or sleeve, having each of its ends constructed to receive the neck 2 and wabbler 3 of a roll. I have shown the ends of the sleeves with a larger bore or opening to receive the necks than to receive the wabblers; this is preferable but not essential. The ends of the sleeve are provided with the brass bushings 4 to prevent injuring the necks of the rolls when the sleeve and the rolls are being assembled. Preferably the sleeve will have the internal lugs or ribs 5 adapted to enter the flutes 6 on the wabblers.

The sleeve 1 is provided opposite the guides 5 with the radially arranged screws 7 which are adapted to have their inner ends between adjacent flutes 6 to clamp or hold the rolls so that when the sleeve is lifted the rolls will remain horizontal or in line with the sleeve. The screws prevent the rolls from tilting and slipping out of the sleeves. As the rolls weigh several tons it is readily seen that serious results might follow the slipping of a roll from the sleeve.

The sleeve may be provided with various devices for the attachment of the hook of a crane, but I prefer the following construction. I secure to the central portion of the sleeve the nut 8, in which the horizontal screw 9 works. The clevis 10 has its ends pivotally connected to the ends of the screw.
The screw is provided with the nuts or collars 11 keyed thereon and located at the outer faces of the clevis. The collars are provided with the holes 12, into which levers may be inserted to turn the screw 9. The screws 7 are also provided with holes 13 for the insertion of operating levers.

A sling or band is provided which consists of a strip of plate-metal 14, having its body formed into a loop, in which the sleeve loosely rests, the ends of the loop being supported in any approved manner by the pin 15 in the side members of the clevis. I have shown these ends riveted to a pair of arms 16 projecting from the collar or sleeve 17 on the said pin 15.

The top or closed end of the clevis forms an eye, into which the hook of a crane may be inserted so that the sleeve with the rolls secured thereon may be raised, supported, and rotated in a horizontal plane during the operation of changing the rolls.

When a roll in a housing is to be changed, one end of the collar 2 is slid upon and secured to one of the wabblers of the said roll, and one of the wabblers of the roll to be substituted is inserted in the remaining end of the collar 2. When the sleeve is raised by means of the crane hook (Fig. 2) the sleeve will lift both rolls and if the band 14 has been adjusted properly the sleeve and rolls will be horizontal. The crane may then be operated to withdraw the first roll from its housing. The sleeve is then revolved 180° in a horizontal plane. The plane is then reversed to carry the substitute roll into the roll housing. The sleeve is then lowered to seat the roll on its bearing blocks; the removed roll is then detached from the sleeve, and the sleeve is removed from the substitute roll.

It is to be understood that the clevis and screw adjustment thereof as well as the sling and other parts shown are merely indicative of the presence of elements constructed to operate on the general principles set forth hereinbefore and in the appended claims.

I claim—

1. In a device for changing rolls, a horizontal member having at each end a socket to contain the end portions of two rolls, means for suspending the said member, and means for maintaining the rolls horizontal when the said member is supported by said suspending means.

2. In a device for changing rolls, a horizontal member having at each end a socket to contain the end portions of two rolls, means engageable with the said end portions of the rolls for maintaining the latter horizontal when the said member is supported by the suspending means.

3. In a device for changing rolls, a horizontal member having at each end a socket to contain the wabblers of two rolls, means for suspending the said member, lugs in the said member to guide the wabblers, and means for maintaining the rolls horizontal when the said member is supported by the suspending means.

4. In a device for changing rolls, a horizontal member having a socket at each end to contain the end portions of two rolls, means for suspending the said member, and means whereby the suspending means may be adjusted longitudinally of the rolls.

5. In a device for changing rolls, a horizontal member having a socket at each end to contain the end portions of two rolls, a clevis, a loop arranged to form a seat for the said member and having its ends secured to the clevis, and means for adjusting the clevis longitudinally of the said member.

Signed at Pittsburg, Pa., this 18th day of October, 1907.

HENRY C. SHAW.

Witnesses:
ALICE E. DUFF,
F. N. BARBER.